United States Patent [19]

Nakamura et al.

[11] Patent Number: 5,780,946
[45] Date of Patent: Jul. 14, 1998

[54] AIR-COOLED TYPE ELECTRIC MOTOR

[75] Inventors: Kosei Nakamura; Yukio Katsuzawa; Yasuyuki Nakazawa, all of Yamanashi, Japan

[73] Assignee: Fanuc Ltd., Yamanashi, Japan

[21] Appl. No.: 874,885

[22] Filed: Jun. 13, 1997

Related U.S. Application Data

[63] Continuation of Ser. No. 535,064, filed as PCT/JP95/00352, Mar. 3, 1995, published as WO95/24068, Sep. 8, 1995, abandoned.

[30] Foreign Application Priority Data

Mar. 3, 1994 [JP] Japan .................. 6-033757

[51] Int. Cl.⁶ .................. H02K 1/32; H02K 9/06
[52] U.S. Cl. .................. 310/58; 310/62; 310/63; 310/89
[58] Field of Search .................. 310/89, 52, 58, 310/62, 63, 64, 71

[56] References Cited

U.S. PATENT DOCUMENTS

| | | | |
|---|---|---|---|
| 1,808,845 | 6/1931 | Gifford et al. | 310/58 |
| 2,438,872 | 3/1948 | Fuge | 171/252 |
| 2,469,820 | 5/1949 | Fuge | 171/252 |
| 2,500,971 | 3/1950 | Wieseman et al. | 310/62 |
| 2,776,385 | 1/1957 | Modrey | 310/62 |
| 2,787,720 | 4/1957 | Ethier et al. | 310/58 |
| 2,929,944 | 3/1960 | Shewmon | 310/62 |
| 3,524,089 | 8/1970 | Willits | 310/62 |
| 3,748,507 | 7/1973 | Sieber | 310/58 |
| 4,565,936 | 1/1986 | Ikegami et al. | 310/62 |
| 4,566,864 | 1/1986 | Yamamoto et al. | 417/353 |
| 5,144,175 | 9/1992 | Craggs | 310/63 |

FOREIGN PATENT DOCUMENTS

| | | |
|---|---|---|
| 0 387 743 | 9/1990 | European Pat. Off. |
| 24 06 489 | 8/1975 | Germany |
| 42 22 131 | 1/1994 | Germany |
| 36-5566 | 5/1961 | Japan |
| 55-10861 | 1/1980 | Japan |
| 2-68659 | 5/1990 | Japan |
| 3-43827 | 9/1991 | Japan |

*Primary Examiner*—Thomas M. Dougherty
*Assistant Examiner*—Tran N. Nguyen
*Attorney, Agent, or Firm*—Nikaido, Marmelstein, Murray & Oram LLP

[57] ABSTRACT

An air-cooled type electric motor (20) includes a rotor, a stator includes a stator core (28), and a front support member (32) and a rear support member (34) arranged at both axial ends of the stator core (28). A plurality of air passages (42), extending continuously in an axial direction, are provided in the stator core (28), the front support member (32), and the rear support member (34). A centrifugal blower unit (50) is placed at further rear side of the rear support member (34). Because the centrifugal blower unit (50) has a large pressure rise, air, surrounding the motor and sufficient to cause an effective cooling, can be made to flow into the air passages (42) with a smaller diameter. A drive section (56) of the blower unit (50) is fixed directly to the rear support member (34) by bolts (72). Consequently, an electric wire (74) for the drive section (56) extends through the interior space of the motor (20), and is connected to a terminal box (48). In this manner, the blowing capacity, and the moisture-proofing of the terminal box, can be improved.

4 Claims, 6 Drawing Sheets

1

AIR-COOLED TYPE ELECTRIC MOTOR

This application is a continuation of application Ser. No. 08/535,064, filed as PCT/JP95/00352, Mar. 3, 1995 published as WO95/24068, Sep. 8, 1995, now abandoned.

TECHNICAL FIELD

The present invention relates to an air-cooled type electric motor, and particularly to an air-cooled type electric motor having a blower means for allowing ambient air to flow inside the motor.

BACKGROUND ART

In the field of air-cooled type electric motors, it is known that a blower unit operated by an exclusive drive source can be placed inside a motor. FIG. 6 shows an example of this type of conventional air-cooled type electric motor. In this motor, a stator core 1 and front and rear support members 3 and 4, at both axial ends of the stator core 1 for supporting the stator core 1 and a rotor 2, are provided with a plurality of air passages 5 which axially penetrate through all of these components. The stator core 1 is fixedly connected to the front and rear support members 3, 4 so that the air passages 5 thereof continuously communicate with each other. A blower unit 6 is located at the rear end of the rear support member 4, and is operated by an exclusive drive section 7 (generally, an electric motor) to cause air surrounding the motor to flow as a cooling medium into the air passages 5. An axial fan having a large flow rate is generally used as the blower unit 6. A casing 8 of the blower unit 6 is connected to the rear support member 3, and the drive section 7 of the blower unit 6 is fixed to a rear end wall 9 of the casing 8. An electric wire 10 for the drive section 7 of the blower unit 6 extends outwardly from the casing 8 to be exposed outside the motor, and is connected to a terminal box 11 supported on the rear support member 4. Electric wires for a winding 12 provided on the stator core 1 and for a revolution detector 13 supported on the rear support member 4 near the end of a shaft of the rotor 2 are also connected to the terminal box 11.

In the above-mentioned air-cooled motor, because a pressure rise due to the axial fan constituting the blower unit is relatively low, it has been required to provide the air passages with a larger sectional area for allowing an air flow, sufficient to cause effective cooling, to pass therethrough under low pressure. Therefore, if the sectional area of the air passages is reduced if the motor is downsized, it becomes difficult for the axial fan to exert a sufficient cooling effect. Also, in the case that the effective sectional area of the stator core is increased under the limited motor dimension, the sectional area of the air passages is inevitably reduced. Therefore, it has been desired to provide cooling air at a higher pressure, so as to allow the air to cause an effective cooling even in such narrower air passages.

Further, in the above air-cooled motor, a bore which opens to the environment of the motor is formed to connect the wire for the driving section of the blower unit with the terminal box. This results in problems that the moisture-proofing of the terminal box is deteriorated, and that the operational reliability of the motor cannot be maintained under certain condition of use.

DISCLOSURE OF THE INVENTION

The object of the present invention is to provide an air-cooled type electric motor, having a blower means, in which the capacity of the blower means and the moisture-proofing of the terminal box are improved, and which thus has a high reliability without deteriorating the air-cooling capacity even in a downsized motor.

To accomplish the above object, the present invention provides an air-cooled type electric motor comprising a rotor; a stator encircling the rotor through an air gap; a pair of support members arranged at both axial ends of the stator to rotatably support the rotor and fixedly support the stator; an air passage provided in a core of the stator to generally axially penetrate through the core; a centrifugal blower unit supported by one of the support members to allow air surrounding the motor to flow into the air passages, a drive section for driving an impeller of the centrifugal blower unit being directly fixed to the one of support members; and an external terminal supported by one of the support members and used to electrically connect the motor with outside apparatuses, an electric wire for the drive section extending through an interior space of the motor and being connected to the external terminal.

A blower means comprising a centrifugal blower unit has a large pressure rise, therefore a cooling air sufficient to cause effective cooling can flow even into an air passage with a relatively small sectional area. By fixing the drive section of the blower unit directly to the support means, the electric wire for the drive section can be placed inside the motor and can be connected to the external terminal without being exposed to the outside of the motor, so that the deterioration of the moisture-proofing of the motor can be prevented.

In the above-mentioned air-cooled motor, it is advantageous that the centrifugal blower unit is composed of a centrifugal fan. It is also preferred that a guide member for guiding air towards the impeller is provided adjacent a suction side of the impeller of the centrifugal blower unit. In this case, the guide member may be advantageously fixed to the one of support members together with the drive section by a common fixing element. Alternatively, the guide member may be fixed to a casing joined to the one of support members. The air passage may be provided to continuously extend in a generally axial direction through the core of stator and the two support members.

BRIEF DESCRIPTION OF THE DRAWINGS

The foregoing and the other objects, features, and advantages of the present invention will be described with relation to the embodiments shown in the accompanying drawings, in which.

BEST MODE OF CARRYING OUT THE INVENTION

Figure 1:
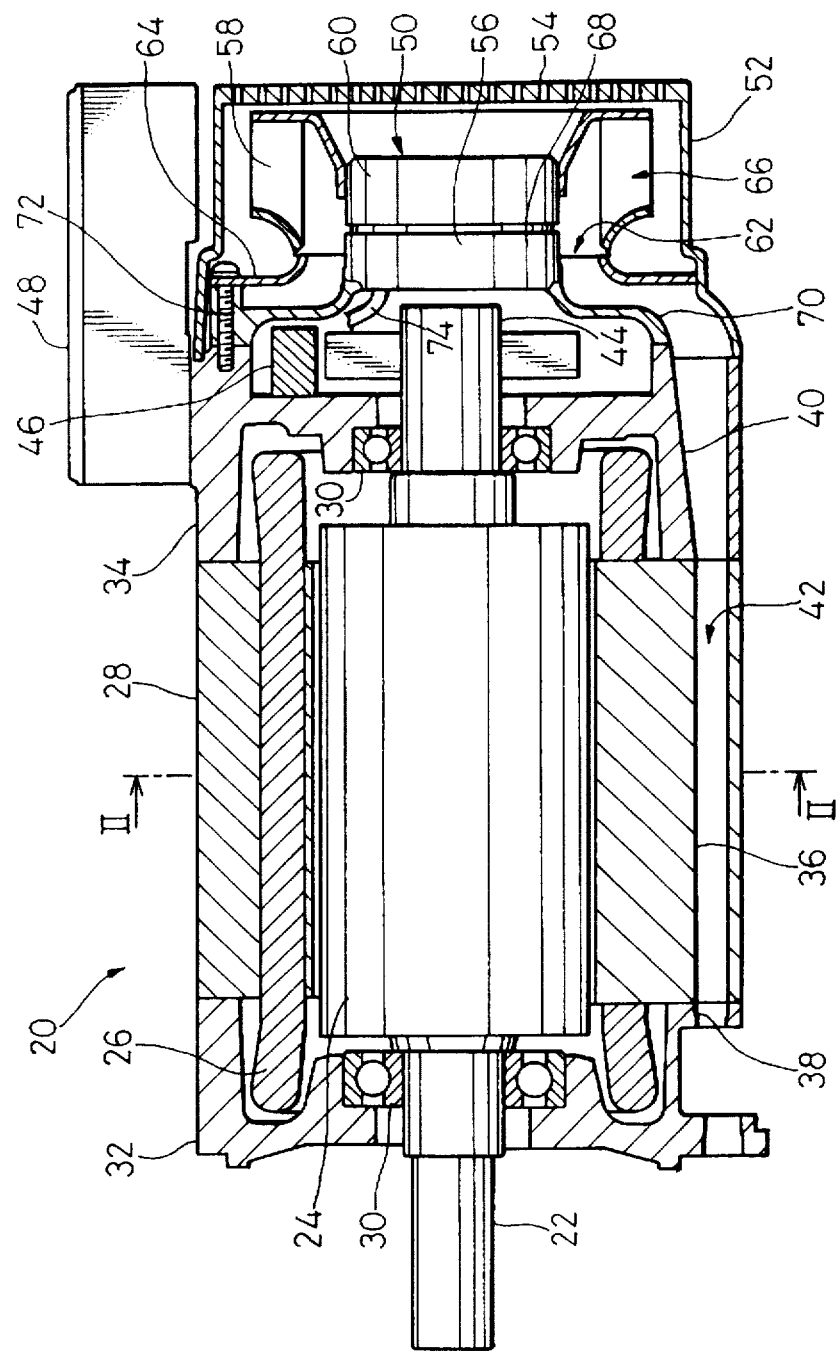
FIG. 1 is a sectional view of an air-cooled type electric motor according to the embodiment of the present invention, taken along line I—I of FIG. 2.
Figure 2:
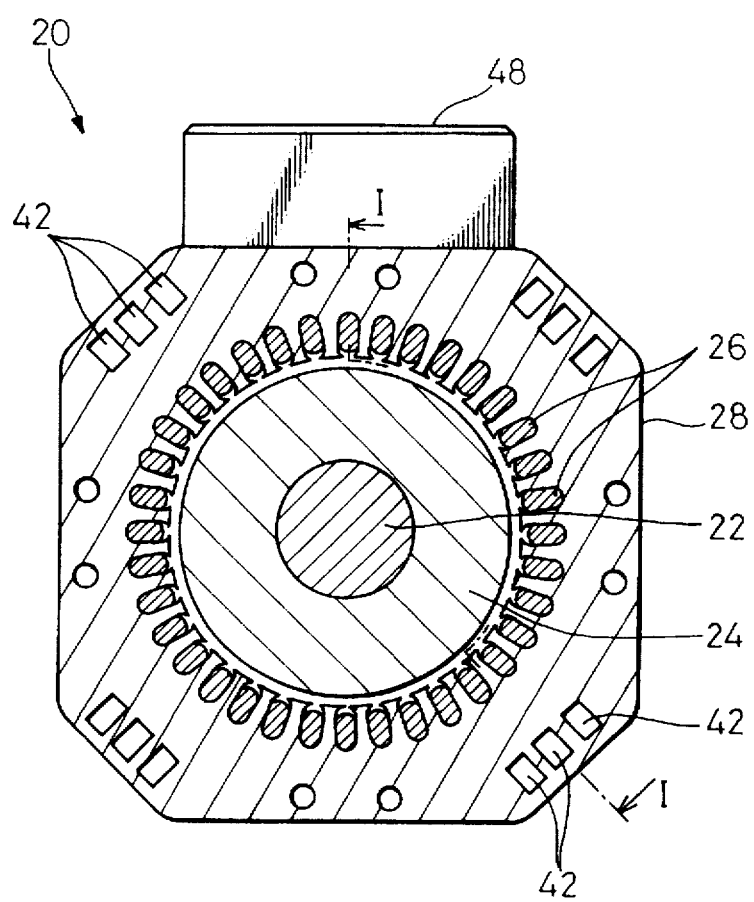
FIG. 2 is a sectional view taken along line II—II of FIG. 1.

Referring to the drawings, FIGS. 1 and 2 show an air-cooled type electric motor 20 according to the embodiment of the present invention. The air-cooled motor 20 includes a rotor having a rotor core 24 fixed onto a shaft 22, a stator having a stator core 28 provided with a winding 26 and encircling the rotor with an air-gap, and a front support member 32 and a rear support member 34 arranged at the both axial ends of the stator core 28 to support the stator core 28 therebetween and rotatably supporting the shaft 22 through bearings 30. The stator core 28, the front support member 32, and the rear support member 34 are provided with an axially extending plurality of through holes 36, 38, 40, respectively, and the through holes 36, 38, 40 are smoothly communicated with each other in the axial direction to form a plurality of air passages 42.

The rear support member 34 supports a revolution detector 46 near a rear end 44 of the shaft 22, and carries on the outer surface thereof a terminal box 48 for accommodating external terminals (not shown). A blower unit 50 is located at the further rear side of the rear support member 34 to allow the ambient air surrounding the motor, as a cooling medium, to flow into the air passages 42. The blower unit 50 is of a centrifugal blower unit, and a casing 52 thereof is fixed onto the rear end face of the rear support member 34. A rear end wall 54 of the casing 52 is preferably made of a perforated material such as a mesh.

The blower unit 50 composed of the centrifugal blower unit generally has a larger pressure rise than that of an axial blower unit, so that, even when the sectional area of the air passages 42 is reduced, an air flow sufficient to cause an effective cooling is made to pass through the air passages 42. Note, further advantageously used as the blower unit 50, from the viewpoint of a pressure or an efficiency, is a centrifugal fan (a turbo fan) with backward curved vanes, rather than a multi-blade fan (a Sirocco fan) with forward curved vanes.

Figure 3:
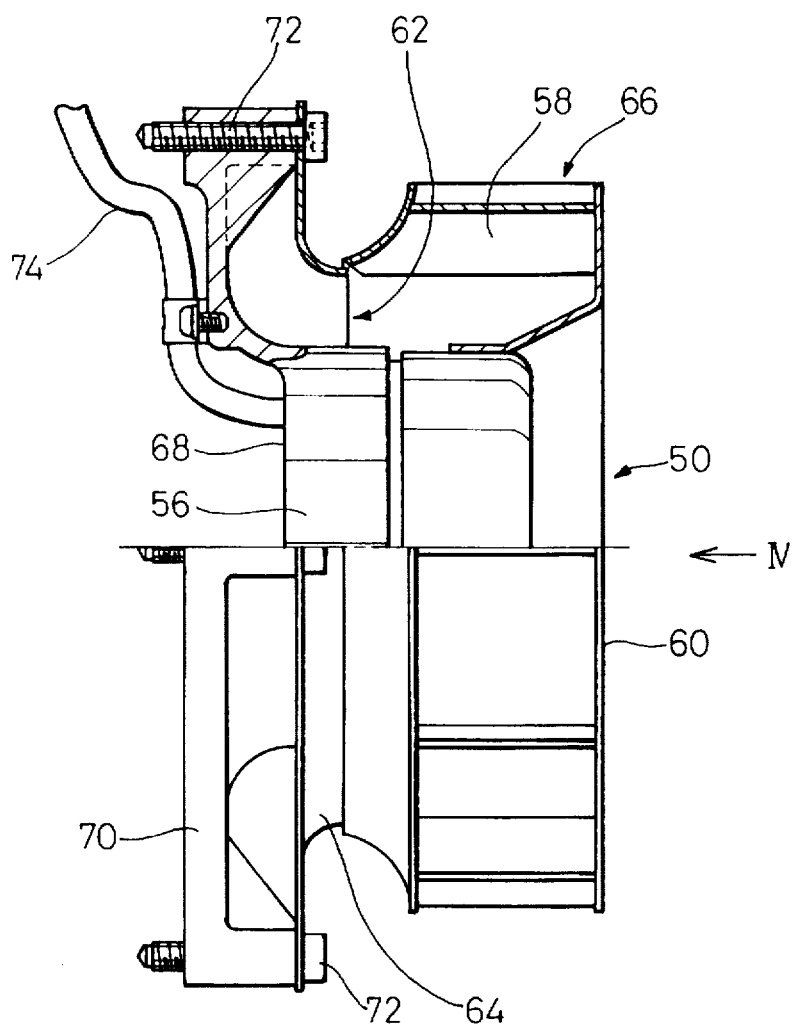
FIG. 3 is an enlarged partial sectional view of a, blower unit used in the electric motor of FIG. 1, taken along line III—III of FIG. 4.
Figure 4:
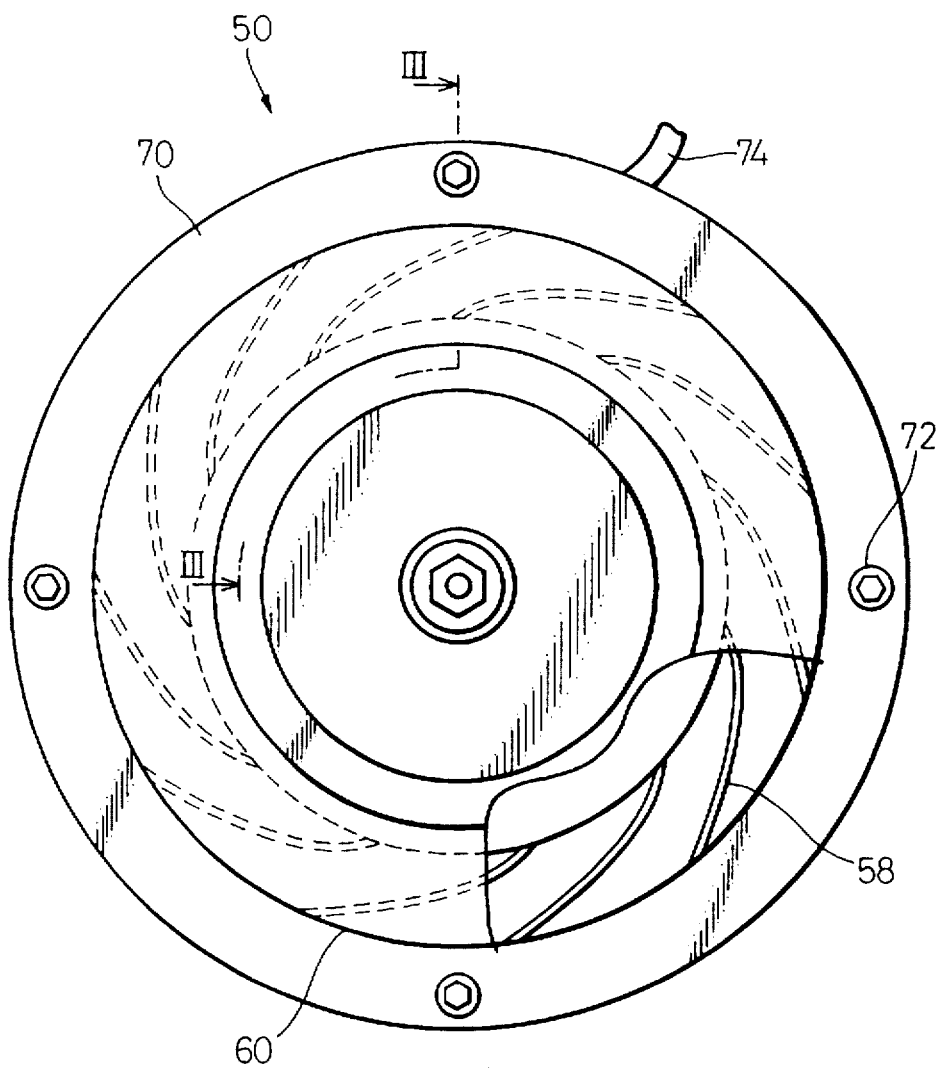
FIG. 4 is a partly cut-out end view shown from arrow IV of FIG. 3.

As shown in FIGS. 1, 3 and 4, the blower unit 50 includes a drive section 56 normally composed of an electric motor, an impeller 60 having a large number of vanes 58 and joined to the drive section 56, and a guide plate 64 disposed adjacent to a suction side 62 of the impeller 60. The guide plate 64 defines a passage around the drive section 56 for smoothly guiding air toward the suction side 62, and acts as a partition between air introduced into the suction side 62 and air discharged from a discharge side 66.

A case 68 of the drive section 56 includes a radially extending case part 70, and is fixed at the outer periphery of the case part 70 to the rear support member 34 by fixing means such as bolts 72. In this situation, the guide plate 64 is preferably fixed to the rear support member 34 together with the case 68 by the bolts 72 for common use. The case 68 of the drive section 56 may be integrally formed with the radially extending case part 70. Alternatively, the case 68 may be formed separately from the case part 70, and then may be joined to the case part 70.

Such an arrangement of the blower unit 50 allows the case 68 and case part 70 of the drive section 56 to act as a cover for covering the rear end 44 of shaft 22 and the revolution detector 46. An electric wire 74 for the drive section 56 is connected to the terminal box 48 while extending through the interior space of the motor, in the same manner as electric wires (not shown) for the winding 26 or the revolution detector 46. Therefore, the provision of holes for wiring on the terminal box 48, which opens to the circumference of the latter, becomes unnecessary, whereby the deterioration of the moisture-proofing of the terminal box 48 can be prevented.

Figure 5:
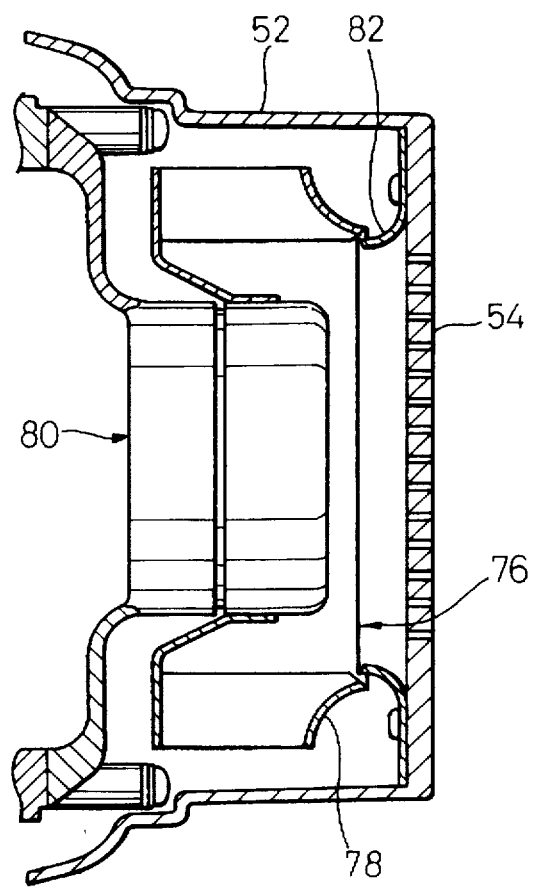
FIG. 5 is a partial sectional view of the modification of a blower unit used in the electric motor of FIG. 1.
Figure 6:
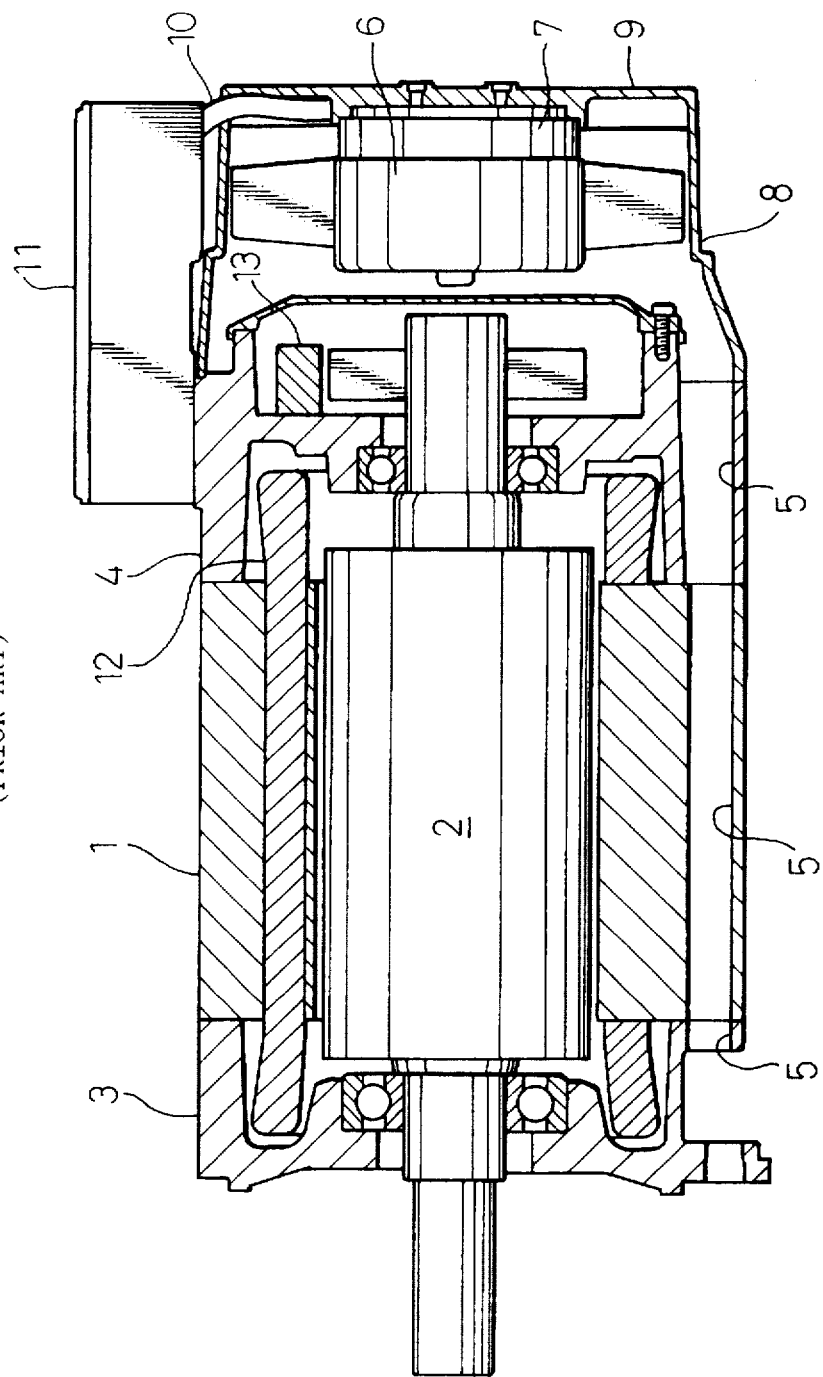
FIG. 6 is a sectional view, corresponding to FIG. 1, showing a conventional air-cooled type electric motor.

In the air-cooled motor 20, the cooling air, flowing due to the operation of the blower unit 50, is blown into the air passages 42 from the front support member 32, and is discharged from the rear end wall 54 of the casing 52 of the blower unit 50. Optionally, the outer tubular surface of the casing 52 may be provided with radially opening outlets (not shown). On the contrary, when air is blown from the rear end wall 54 of the casing 52 and discharged from the front support member 32, a blower unit 80 having an impeller 78 can be used, a suction side 76 of the impeller 78 being disposed adjacent the rear end wall 54, as shown in FIG. 5. In this occasion, a guide plate 82 is fixed to the rear end wall 54 of the casing 52 as illustrated.

INDUSTRIAL APPLICABILITY

The present invention adopts a centrifugal blower unit having a large pressure rise as blower means, so that a cooling air sufficient to cause an effective cooling is caused to flow even in air passages with relatively small sectional areas. Accordingly, the areas of the air passages can be reduced without deteriorating the cooling efficiency of the blower means, and thereby the air-cooled motor can be easily downsized. Further, the drive section of the blower unit is directly fixed to the support member, and the electric wire for the drive section is disposed in the interior space of the motor, so that the wire can be connected to the terminal without being exposed to the exterior of the motor, and the deterioration of the moisture-proofing of the terminal box can be prevented. Therefore, according to the present invention, a small, air-cooled type electric motor with a high reliability can be provided.

We claim:

1. An air-cooled type electric motor comprising:

a rotor having a shaft;

a stator encircling said rotor through an air gap;

a pair of support members arranged at both axial ends of said stator rotatably supporting said shaft of said rotor and fixedly supporting said stator;

plural air passages provided in a core of said stator to generally axially penetrate through said core, said air passages continuously extending in a generally axial direction through each of said core of said stator and said pair of support members;

a separate centrifugal blower unit directly supported by one of said support members and independent of said shaft of said rotor, said blower unit forcing air surrounding the motor to flow into said air passages, a separate drive section for driving an impeller of said centrifugal blower unit, wherein said drive section comprises a drive section case, and wherein said drive section case h as a radially extending case part, said case part being directly fixed to said one of said support members closing an end of said one of said support members and covering an end of said shaft of said rotor, said centrifugal blower unit being a centrifugal fan having backward curved vanes, and wherein an exhaust direction of said centrifugal blower unit can be switched by exchanging said impeller;

a casing attache d to said one of said support members and covering said separate centrifugal blower unit; and an external terminal supported by one of said support members and used to electrically connect the motor with outside apparatuses, an electric wire for said drive section extending through an interior space of the motor and being connected to said external terminal.

2. An air-cooled type electric motor as set forth in claim 1, wherein a guide member for guiding air towards said impeller is provided adjacent a suction side of said impeller of said centrifugal blower unit , said guide member being disposed inside of said casing, said guide member defining a passage around said drive section for smoothly guiding air into said suction side and acts as a partition between said suction side and a discharge side of said impeller.

3. An air-cooled type electric motor as set forth in claim 2, wherein said guide member is fixed to said one of said support members, together with said drive section, by a commonfixing element.

4. An air-cooled type electric motor as set forth in claim 2, wherein said guide member is fixed to said case part joined to said one of said support members.

\* \* \* \* \*